United States Patent [19]

Johnson

[11] 4,250,923
[45] Feb. 17, 1981

[54] SHIFT ACTUATOR FOR A MULTI-SPEED TRANSMISSION

[76] Inventor: Mark R. Johnson, 2081 Essenay Ave., Walnut Creek, Calif. 94596

[21] Appl. No.: 960,016

[22] Filed: Nov. 13, 1978

[51] Int. Cl.³ .................... F16K 11/07; F16K 31/524
[52] U.S. Cl. ................ 137/625.69; 251/251; 74/107
[58] Field of Search .................. 251/251; 137/625.12, 137/625.69; 74/107

[56] References Cited

U.S. PATENT DOCUMENTS

| 1,748,732 | 2/1930 | Rode ................................ 251/251 X |
| 2,928,612 | 3/1960 | MacCracken et al. ..... 137/625.12 X |
| 3,279,748 | 10/1966 | Coulter ....................... 137/625.69 X |
| 3,352,325 | 11/1967 | Stryker ............................ 137/625.69 |
| 3,903,926 | 9/1975 | Constantinesco ................. 251/251 X |

FOREIGN PATENT DOCUMENTS

| 657163 | 2/1963 | Canada ................................ 137/625.69 |
| 286819 | 3/1928 | United Kingdom ..................... 251/251 |

*Primary Examiner*—Arnold Rosenthal
*Attorney, Agent, or Firm*—Phillips, Moore, Weissenberger, Lempio & Majestic

[57] ABSTRACT

A shift actuator for a multi-speed transmission includes a valve body and a spool movably positioned in a bore defined in the valve body. Fluid pressure acts on one end of the valve spool while a rotary cam is manually positionable to move the spool to various operating positions. Porting communicating with the valve bore is selectively blocked by the spool in its various positions.

10 Claims, 4 Drawing Figures

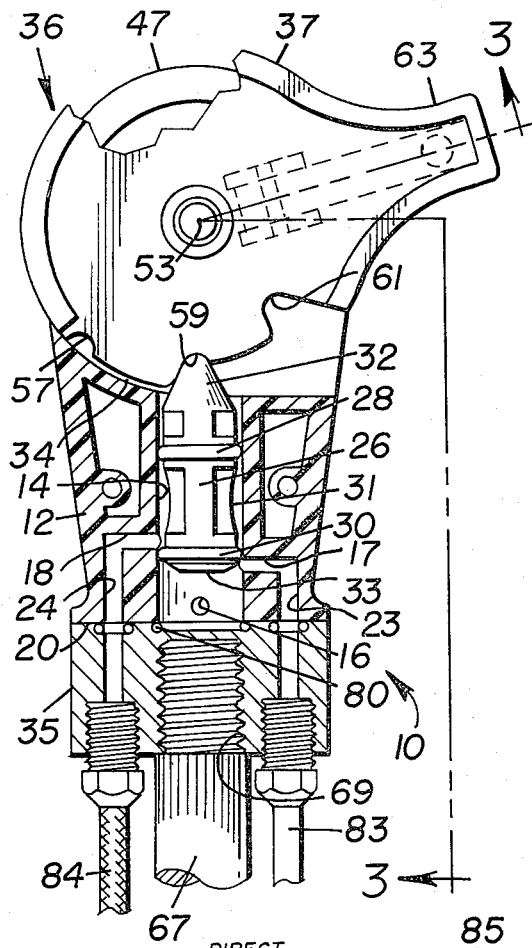
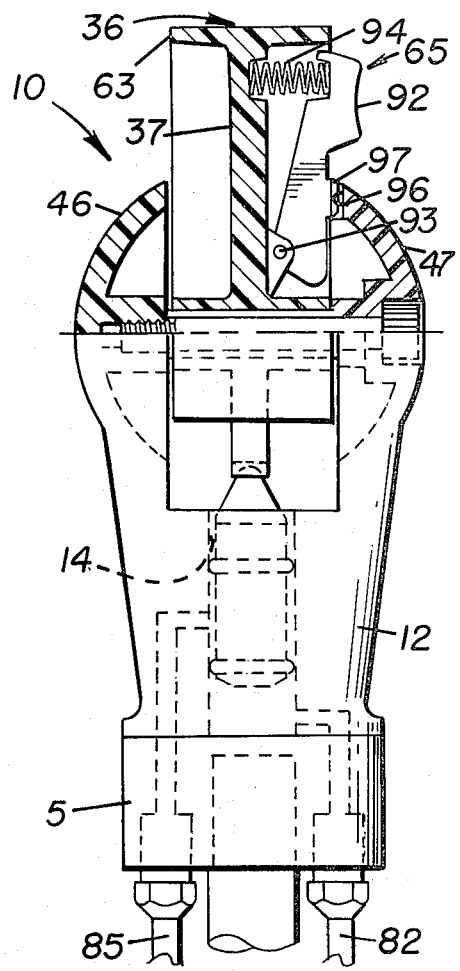
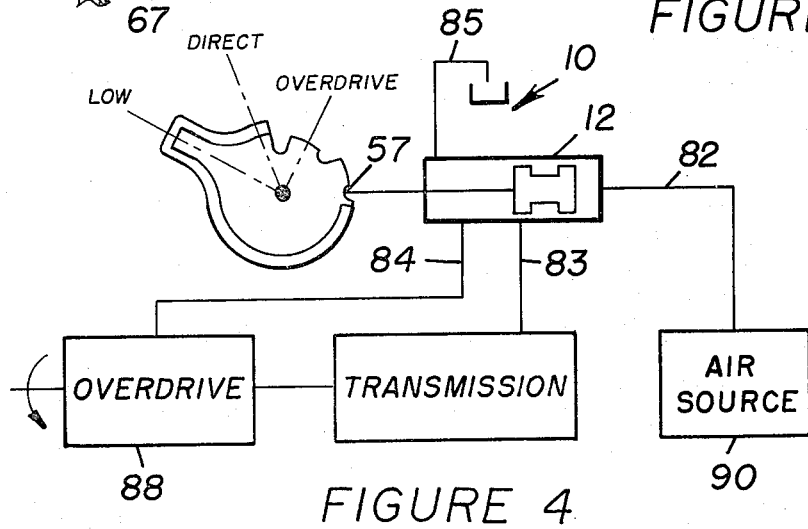

SHIFT ACTUATOR FOR A MULTI-SPEED TRANSMISSION

DESCRIPTION

TECHNICAL FIELD

This application relates to a shift actuator for a multi-speed transmission. In particular it relates to a valve structure operable from an operator's cab in a vehicle for fluid operation of a transmission.

BACKGROUND ART

Multi-speed transmissions of the type utilized in heavy road vehicles generally are composed of a multi-speed transmission section, a range section and a splitter gear or overdrive section. One ratio in the multi-speed section may be used only in the low range as a starting gear while the remaining four ratios are each used first with the low range and then with the high range section. While in the high range section the four ratios utilized can be further "split" by the overdrive. That is each gear can first be engaged with the "direct" drive and then with the "overdrive" range.

In order to accomplish this, the transmission control available to the operator usually includes a shifting cane for operating the multi-speed transmission and an auxiliary control for shifting from low range to high range and while in the high range for shifting from direct to overdrive. It is to be understood that all multi-speed transmissions of the type envisioned have required a clutch, however the clutch or operation thereof is not pertinent to this invention. In the past various valving schemes have been provided for fixture to the shifting cane however all have suffered one or more drawbacks.

In one instance the low-high range valve is separately mounted below the end of the shifting cane thus necessitating either removing the hand from the knob and the end of the shifting cane or utilizing the other hand to shift from low to high range.

In another scheme illustrated in part in U.S. Pat. No. 3,979,967 a flat head is placed on the end of shifting cane with a thumb operated lever projecting radially outwardly from the flat head. The thumb operated lever is movable between three positions namely the low range position, the high range or direct position and the overdrive position. During highway operation shift between direct and overdrive may occur rather frequently and is accomplished by the operator's thumb. The aforementioned patent teaches a modification to the shifting cane to facilitate movement between the direct and overdrive position.

Nevertheless the conventional valving structure mounted on the end of the shifting cane and illustrated in the aforementioned patent even while so modified becomes burdensome to operate and in some instances, the operator's thumb may become pinched between the housing and the thumb operated lever.

It is most important that the operator have a convenient, easily operated safe valve at his immediate beck and call since shifting a transmission of a road operated vehicle is most important. Such shifting is necessary in order to maintain the speed of the driving engine within an acceptable range. This is required because of the use of an internal combustion compression ignition engine which operates best in a narrow engine speed range rather than a wide range of speeds.

DISCLOSURE OF THE INVENTION

This invention is directed to overcoming one or more of the problems set forth above.

In one aspect of this invention an improved shift actuator for use with a source of fluid under pressure includes a valve body defining a longitudinal bore and first and second ports communicating with the bore. The first and second ports are at longitudinal spaced apart points. A valve spool is slidably positioned in the bore while means for closing the longitudinal bore at the end adjacent the first port is also included. A rotary cam assembly is selectively movable for positioning the valve spool in the bore to block communication through the bore between the first and second ports and to position the valve spool to communicate the first port with the second port. A source of fluid under pressure communicates with the first port thus urging the valve spool away from the first port.

The problem of earlier shift actuators for multi-speed transmission involved the radial movement of the valve spool about an axis coincident with or parallel to the axis of the shifting cane. In this particular invention the longitudinal arrangement of the valve body permits the caming member to be operated between the thumb and forefinger about an axis perpendicular to the shifting cane as opposed to an axis coincident with the shifting cane.

BRIEF DESCRIPTION OF THE DRAWINGS

FIG. 2 is a side elevation view partly in section of the assembled embodiment depicted in FIG. 1.

FIG. 3 is a front elevation taken at section line 3—3 of FIG. 2 of the same embodiment.

FIG. 4 is a schematic of a shift actuator shown in combination with a transmission overdrive assembly.

BEST MODE FOR CARRYING OUT THE INVENTION

Figure 1:
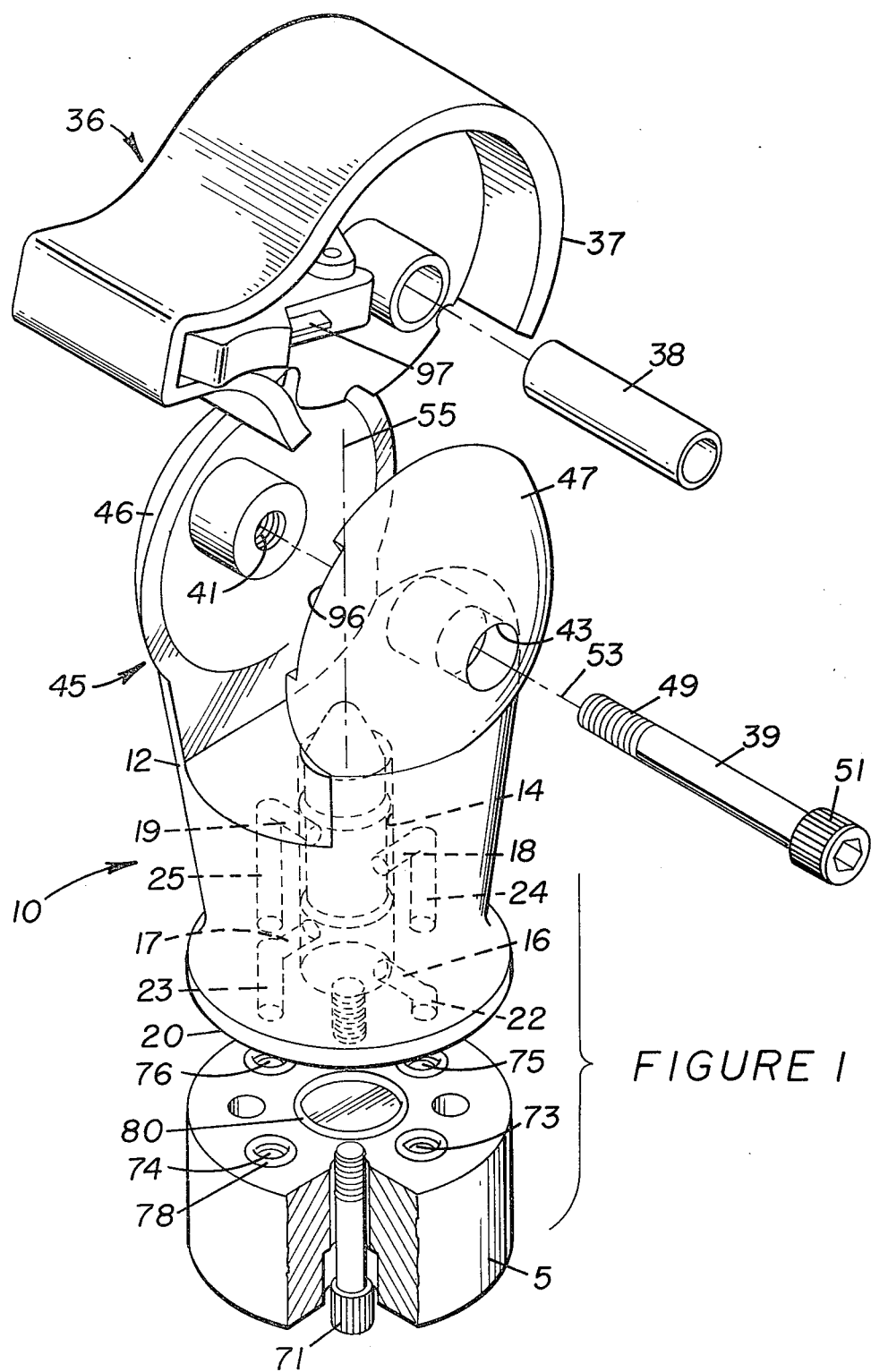
FIG. 1 is an expanded view in perspective of an embodiment of the present invention.

Referring to FIG. 1, a shift actuator 10 is comprised of a valve 12 defining a longitudinal bore 14 therethrough. Four ports, first port 16, second port 17, third port 18 and fourth port 19 each communicate with longitudinal bore 14 at spaced apart locations with first port 16 adjacent to end 20.

Similarly first passageway 22, second passageway 23, third passageway 24 and fourth passageway 25 communicate respectively first port 16, second port 17, third port 18 and fourth port 19 to end 20.

Slidably mounted in longitudinal bore 14 is spool 26 which has mounted thereabout in appropriate grooves 'O' ring 28 and 'O' ring 30 to sealingly associate spool 26 with a longitudinal bore 14. It is to be understood that the 'O' rings 28 and 30 may be of the conventionally elastomeric design. The center body portion 31 of spool 26 may take on a cruciform cross-section as indicated in FIG. 2 however this cross-section is not critical to the design of this valve structure. The end 32 of spool 26 is appropriately conically shaped having a rounded end to engage a caming surface 34 of a rotating cam assembly 36. Rotating cam assembly 36 is mounted in the valve body 12 distal of end 20. The other opposite end 33 of spool 26 is formed with an extension such as the frusto conical extension indicated in FIG. 2 to ensure spool 26 does not fully seat on closure member 35 thus blocking communication to longitudinal bore 14 from first port 16.

Referring again to FIG. 1, rotating cam assembly 36 is comprised of a cam member 37 of which caming surface 34 forms an integral part. Cam member 37 is rotatably mounted about a sleeve 38 for pivotal motion. Sleeve 38 is fitted on an axle 39 which may be threadably engaged in a bore 41 after passing through a bore 43 in two portions of bifurcated end 45 of valve body 12. As indicated in FIG. 1 bore 41 may be threaded and is formed in first bifurcation 46 while bore 43 is formed in second bifurcation 47. Axle 39 may have a threaded end 49 with the opposite end formed with a socketed arrangement such as socketed end 51. Other means of fixing axle 39 in valve body 12 should be apparent to those skilled in the art.

Axis 53 of axle 39 is substantially perpendicular to axis 55 of spool 26 when spool 26 is located in longitudinal bore 14. Axis 53 should also pass through axis 55 or be substantially close thereto so that cam member 37 may not be rotated about axis 53 by a force applied on axis 53.

Camming surface 34 is formed with three notches 57, 59 and 61 as indicated in FIG. 2. The notches 57, 59 and 61 are successively closer to axis 53 so that rotation of cam member 37 will successively permit spool 26 to move higher in longitudinal bore 14 thus successively opening ports 17 and 18 to communication with port 16.

Cam member 37 may be radially rotated about axis 53 by an extension 63 which may be integrally formed therewith. Extension 63 may have associated therewith a detent mechanism 65 and which may partially limit freedom of movement of cam member 37. Detent mechanism 65 will be further described in a later part of this specification.

Closure member 35 is adapted to be mounted on a shifting cane 67 by a threaded connection 69 or the like. Valve body 12 is fitted to closure member 35 by a plurality of bolt member 71, one of which is shown in FIG. 1. Closure member 35 is formed with four bores 73, 74, 75 and 76 each communicating respectively with first, second, third and fourth passageways 22, 23, 24 and 25. Each bore 73, 74, 75 and 76 is adapted to receive an 'O' ring 78 at the end adjacent valve body 12 thus making a fluid tight connection therebetween. In addition to 'O' ring 78, an 'O' ring 80 is positioned between closure member 35 and valve body 12 substantially coincident with longitudinal bore 14.

Means are provided for connecting four conduits such as conduits 82, 83, 84 and 85 as indicated in FIGS. 2 and 3 to bores 73, 74, 75 and 76 respectively. The interconnecting means may be anything appropriate in the art. In FIGS. 2 and 3 a compression type fitting is shown threadably engaged with the closure member 35.

Referring now to FIG. 4 for an understanding of the operation, it can be seen that the shift actuator 10 is usable with an air source 90 which provides air through conduit 82 to bore 73 thence first passageway 22 for communication to first port 16. Although an air source 90 is shown any other fluid pressure source would be appropriate. Application of fluid pressure to port 16 causes spool 26 to be urged upwardly into engagement with notch 57. While spool 26 is engaged in notch 57 ports 17, 18 and 19 are closed thus no fluid pressure is provided to these ports. Rotation of cam member 37 in the clockwise direction as shown in FIG. 2 permits valve spool 26 to be urged upwardly by air pressure. Upon engagement with notch 59 fluid pressure is communicated from port 16 to port 17 thence through passage 23 or bore 74 and conduit 83. Conduit 83 may be interconnected with the high-low range section of the transmission thus shifting the transmission from the low range to the high range.

Upon movement of cam member 37 in a clockwise direction detent assembly 65 comes into operation so that detent 92 is urged outwardly about pivot 93 by resilient member 94. A projection 97 formed on detent member 92 engages a cut away portion or groove 96 formed on the inner facing surface of second bifurcation 47 as shown in FIG. 1. At this point the cam member cannot be rotated in the counter clockwise direction to return the transmission from the high range to the low range without depressing a detent member 92. However the cut away portion 96 permits rotation of the cam member 37 further in a clockwise direction to permit spool 26 to be urged upwardly into notch 61. With spool 26 urged in this direction by fluid pressure that is to engage notch 61, fluid pressure is communicated from a port 16 to both ports 17 and 18. From port 18 fluid pressure is communicated through passageway 24 and bore 75 to conduit 84. Conduit 84 may communicate with overdrive portion 88 of the transmission. Fluid pressure communicated to the overdrive portion shifts the overdrive portion from a "direct drive" condition to an "overdrive" condition. This particular portion is also termed the "splitter" portion of the transmission and is utilized in operation of heavy vehicles to closely adjust engine speed while obviating the need for repositioning the shifting cane.

Finally a port 19 may be provided to vent off pressure passing the lower 'O' ring 30 of spool 26. It should be understood that bleed off to conduit 85 is not necessary to the invention when utilized in the environment described herein. Further it should be understood that port 19 could be used for further control of a more complex transmission.

Although this invention has been described in relation to a particular embodiment it should be understood that other embodiments within the skill of the art are also within the purview of this specification.

What is claimed is:

1. A shift actuator for a multi-speed transmission, the multi-speed transmission including a source of fluid under pressure, the shift actuator comprising:
   a valve body defining a longitudinal bore and first and second ports communicating with said bore at longitudinally spaced apart points;
   a valve spool slidably positioned in said bore;
   closure means for closing said longitudinal bore at an end adjacent said first port;
   rotary cam means pivotally mounted on said valve body distal said closure means for selectively positioning said valve spool in said bore (1) to block communication through said bore between said first and second ports and (2) to communicate said first port to said second port;
   detent means for selectively retaining said rotary cam means in a first position to block communication through said bore between said first and said second ports or in a second position to communicate said first port to said second port;
   the source of fluid under pressure for communicating with said first port to urge said valve spool away from said first port.

2. The shift actuator of claim 1 wherein said rotary cam means comprises a rotating cam assembly pivotally mounted on an axis perpendicular to the axis of the longitudinal bore of said valve body.

3. The shift actuator of claim 1 wherein said rotary cam means comprises a rotating cam assembly pivotally mounted on an axis substantially perpendicular to and intersecting the axis of the longitudinal bore of said valve body, said rotating cam assembly defining a cam surface, the valve spool defining a cam follower at one end thereof substantially on the axis of said valve spool; said cam surface formed to position said valve spool in a first position with said rotating cam assembly in a first position and to position said valve spool in a second position with said rotating cam assembly in a second position.

4. The shift actuator of claim 3 wherein the rotary cam means further comprises a pivot and further wherein the valve body defines a bifurcated end distal of the closure means; each of the bifurcations for receiving one end of said pivot; said pivot for mounting the rotating cam assembly.

5. The shift actuator of claim 4 wherein one of the bifurcations defines at least one groove on the inner facing surface of the bifurcation and further wherein the detent means comprises a detent pivotally affixed to the rotating cam assembly, said detent adapted to engage said bifurcation groove with said rotating cam assembly in the second position.

6. The shift actuator of claim 3 wherein the rotating cam assembly defines a lobe extending radially outwardly therefrom, said lobe formed to facilitate manual use of said rotating cam assembly.

7. The shift actuator of claim 1 wherein said valve bore defines a third port.

8. The shift actuator of claim 7 wherein said valve bore defines a fourth exhaust port.

9. A shift actuator for a multi-speed transmission, the multi-speed transmission including a source of fluid under pressure, the shift actuator comprising:
 a valve body defining a longitudinal bore and first and second ports communicating with said bore at longitudinally spaced apart points;
 a valve spool slidably positioned in said bore;
 closure means for closing said longitudinal bore at an end adjacent said first port;
 said valve body defining a bifurcated end distal of said closure means;
 a rotating cam assembly pivotally mounted on said valve body on an axis substantially perpendicular to and intersecting the axis of the longitudinal bore of said valve body, said rotating cam assembly defining a cam surface, the valve spool defining a cam follower at one end thereof substantially on the axis of said valve spool, said cam surface formed to position said valve spool in a first position with said cam assembly in a first position to block communication through said bore between said first and second bores and to position said valve spool in a second position with said rotating cam assembly in a second position to communicate said first port to said second port, said rotating cam assembly further including a pivot and further wherein the valve body defines a bifurcated end distal of the closure means; each of the bifurcations for receiving one end of said pivot, said pivot for mounting the rotating cam assembly;
 detent means for selectively retaining said rotating cam assembly in said first or said second position;
 the source of fluid under pressure for communicating with said first port to urge said valve spool away from said first port.

10. A shift actuator for controlling the overdrive and the range section of a multi-speed transmission, the multi-speed transmission including a source of pressurized air and a shifting cane, the shift actuator comprising:
 a valve body mountable on said shifting cane, said valve body defining a longitudinal bore, said valve body further defining first, second and third spaced apart ports communicating with said longitudinal bore, said first port for communication with said source of fluid pressure;
 closure means for sealing one end of said bore adjacent said first port;
 a valve spool slidably positioned in said bore;
 rotary cam means pivotally mounted on said valve body for selectively positioning said valve spool in said bore to (1) block said second and third ports, (2) communicate said first port with said second port or (3) communicate said first port with said second and third ports;
 the source of fluid under pressure for communicating with said first port to urge said valve spool away from said first port.

* * * * *